(12) United States Patent
Burkhart et al.

(10) Patent No.: US 11,112,788 B2
(45) Date of Patent: Sep. 7, 2021

(54) POSITION-DEPENDENT REPRESENTATION OF VEHICLE ENVIRONMENT DATA ON A MOBILE UNIT

(71) Applicant: ZF Friedrichshafen AG, Friedrichshafen (DE)

(72) Inventors: Michael Burkhart, Ravensburg (DE); Thomas Rösch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 222 days.

(21) Appl. No.: 15/322,004

(22) PCT Filed: Jun. 2, 2015

(86) PCT No.: PCT/EP2015/062216
§ 371 (c)(1),
(2) Date: Dec. 23, 2016

(87) PCT Pub. No.: WO2016/000894
PCT Pub. Date: Jan. 7, 2016

(65) Prior Publication Data
US 2017/0131713 A1    May 11, 2017

(30) Foreign Application Priority Data
Jul. 2, 2014 (DE) .................. DE102014212819.6

(51) Int. Cl.
*G05D 1/00* (2006.01)

(52) U.S. Cl.
CPC ...... *G05D 1/0038* (2013.01); *B60R 2300/105* (2013.01); *G05D 2201/0213* (2013.01)

(58) Field of Classification Search
CPC .......... G05D 1/0038; G05D 2201/0213; B60R 2300/105
See application file for complete search history.

(56) References Cited

U.S. PATENT DOCUMENTS

| 6,985,171 | B1 * | 1/2006 | Kuriya | B60R 1/00 340/435 |
| 8,081,211 | B2 * | 12/2011 | Chou | B60R 1/00 348/118 |

(Continued)

FOREIGN PATENT DOCUMENTS

| DE | 10 2008 034 606 A1 | 1/2010 |
| DE | 10 2012 200 721 A1 | 7/2013 |
| EP | 1 510 849 A1 | 3/2005 |

OTHER PUBLICATIONS

International Search Report and Written Opinion of the International Search Authority dated Sep. 12, 2015 in International Application No. PCT/EP2015/062216 (English and German languages) (13 pp.).

*Primary Examiner* — Frederick M Brushaber
(74) *Attorney, Agent, or Firm* — Crowell & Moring LLP

(57) ABSTRACT

The present disclosure, in one aspect, provides a method for monitoring a vehicle environment. The method may include determining environmental data of a vehicle with an environmental sensor system, transmitting the environmental data to a mobile unit, determining a local position of the mobile unit with respect to the vehicle, and selecting a subset of the environmental data based on the local position of the mobile unit and depicting the subset of the environmental data on the mobile unit.

16 Claims, 1 Drawing Sheet

(56) References Cited

U.S. PATENT DOCUMENTS

| | | | | |
|---|---|---|---|---|
| 8,094,170 | B2* | 1/2012 | Kato | B60R 1/00 |
| | | | | 345/647 |
| 8,390,695 | B2* | 3/2013 | Imanishi | B60R 1/00 |
| | | | | 348/222.1 |
| 10,183,621 | B2* | 1/2019 | Hodohara | H04N 5/3572 |
| 10,810,762 | B2* | 10/2020 | Seki | G06T 7/85 |
| 2006/0055776 | A1* | 3/2006 | Nobori | G06T 7/246 |
| | | | | 348/142 |
| 2008/0309763 | A1* | 12/2008 | Hongo | G06T 3/00 |
| | | | | 348/148 |
| 2010/0007734 | A1* | 1/2010 | Yamazaki | B60R 1/00 |
| | | | | 348/148 |
| 2010/0014770 | A1* | 1/2010 | Huggett | G06T 3/00 |
| | | | | 382/260 |
| 2010/0134488 | A1* | 6/2010 | Kido | G05D 1/0044 |
| | | | | 345/419 |
| 2011/0032374 | A1* | 2/2011 | Imanishi | B60R 1/00 |
| | | | | 348/222.1 |
| 2011/0156957 | A1* | 6/2011 | Waite | G01S 5/0221 |
| | | | | 342/450 |
| 2012/0139816 | A1* | 6/2012 | King | B60Q 9/00 |
| | | | | 345/7 |

* cited by examiner

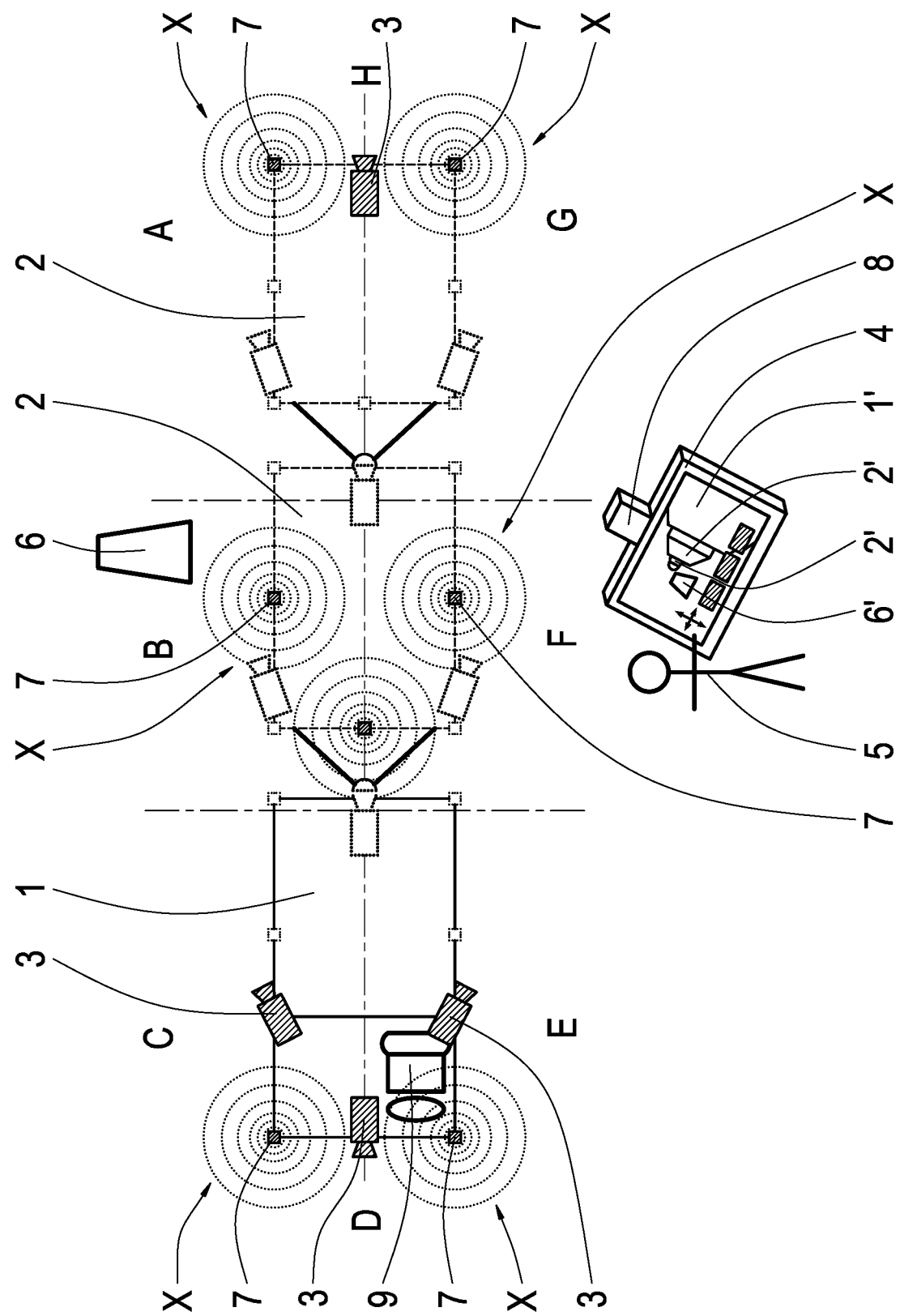

POSITION-DEPENDENT REPRESENTATION OF VEHICLE ENVIRONMENT DATA ON A MOBILE UNIT

CROSS REFERENCE TO RELATED APPLICATIONS

This application is a filing under 35 U.S.C. § 371 of International Patent Application PCT/EP2015/062216, filed Jun. 2, 2015, and claims the priority of German Patent Application 10 2014 212 819.6, filed Jul, 2, 2014. These applications are incorporated by reference herein in their entireties.

BACKGROUND

The present disclosure relates to a procedure through which the environmental data for a vehicle will be determined by means of an environmental sensor system. This will be transferred to a mobile unit and represented there. The present disclosure further relates to a computer program product for the performance of the procedure as well as a driving assistance system for monitoring a vehicle's environment and a mobile unit for monitoring a vehicle's environment.

A procedure for representing the environment of a vehicle on a mobile unit is known from DE 10 2008 034 606 A1. From this, it is known that a perspective that renders a virtual road surface level will be modified depending on the recognized driving intention of the driver.

A procedure for monitoring a vehicle's environment is also known from DE 10 2012 200 721 A1. Thereby, at least a section of the vehicle's environment will be displayed on the mobile unit's display equipment, whereby the displayed section will be determined by the orientation of the mobile unit.

The rendering of the environmental data known from the state of the technology on the mobile unit can be disadvantageous for a mobile unit user due to the multitude of displayed information. It can be difficult to separate important information from unimportant information.

SUMMARY

The task related to the present embodiments is therefore to display the environmental data on such a mobile unit to the user in a manner appropriate to the situation.

This task will be resolved through the characteristics of the independent patent claims. Preferred forms of execution of this can be found in the respective dependent claims.

Accordingly, a procedure for monitoring a vehicle's environment will be suggested, whereby a vehicle's environmental data will be determined by means of an environmental sensor system. The environmental data determined will be transferred to a mobile unit and represented there. Determining the local position of the mobile unit with regard to the vehicle is the intention thereby. The environmental data that will been determined by means of the environmental sensor system will then be represented depending on the respectively determined local position of the mobile unit.

Thereby, only that environmental data that a user of the mobile unit will need at the respective local position will be depicted. For example, such environmental data, in particular images or video that are definitely visible for the user from the current local position, will be displayed by the representation on the mobile unit. Furthermore, the data can be depicted differently depending on the local position, in particular the propagation of the environmental data on the mobile unit. Thereby, color renderings, a rendering form or a perspective rendering can be adjusted to the respective local position of the mobile unit, for example. The amount of the information that the operator of the mobile unit will receive based on the environmental data depicted there can therefore be significantly reduced.

The environmental sensor system may involve a camera and/or a video system in particular. The environmental sensor system may optionally or additionally have radar sensors, ultrasound sensors, infra-red sensors and so on. The data generated by these sensors will form the environmental data that will be used for monitoring the vehicle's environment. Correspondingly, the environmental data, in particular images, video and/or the distance to obstacles and/or position of obstacles with regard to the vehicle and/or speed of the obstacles with regard to the vehicle and so on. The underlying intention of the present embodiments is to represent that data ultimately on the mobile unit that is relevant for the respective local position of the mobile unit or to design the depiction of the environmental data appropriately for the respective local position.

Preferably, the vehicle's environment will be divided into multiple discrete sectors. Thereby, the sector in which the mobile unit is located will be determined. The environmental data will then be depicted on the mobile unit depending on the sector determined. In principle, the determination of the local position, or the respective sector in which the mobile unit is currently located, can be determined by means of the environmental sensor system. Alternatively, a special localization sensor system can be used. By dividing the vehicle's environment in to multiple discrete sectors, the number of potential variations for the representation on the mobile unit will be reduced. Therefore, calculation and/or storage capacity can be saved.

Preferably, the intention is to depict such environmental data that is essentially located in a non-visible area of the vehicle's environment from the determined local position depending on the determined local position of the mobile unit. A dead angle of the vehicle's environment may therefore be involved in the non-visible area of the vehicle's environment, for example. This is therefore an area of the vehicle's environment that cannot be visually seen by an operator of the mobile unit at the current position of their mobile unit. For example, this may be a side of the vehicle removed from the current local position. The mobile unit can then depict an image or video signal especially from this removed side of the vehicle. The environmental data displayed will therefore include only the information that the operator cannot see for themselves from their local position.

Preferably, the environmental sensor system will therefore have at least one camera that can record camera images of the vehicle's environment. This may include the entire vehicular environment in particular. Correspondingly, the environmental sensor system will also be able to have several such cameras that will be distributed on the vehicle. In this case, the environmental data represented on the mobile unit will be camera images of the vehicular environment from the determined local position from the non-visible area. Thereby, live camera images may be involved, such as a respective current camera image of the respective area of the vehicle's environment. The local position of the mobile unit can, for example, be determined by evaluation of the environmental data from the environmental sensor system, such as from camera images from the environmental sensor system. Thus, the local position can be determined through visual detection by the operator of the mobile unit and through subsequent arrangement of the determined visual positions on the camera images regarding the respective local position with regard to the vehicle. Or, the local position can be determined through detection of the visual markings that will be mounted on the mobile unit, on the camera images and through subsequent arrangement of the detected marking positions on the camera images regarding the respective local position with regard to the vehicle.

For the determination of the local position of the mobile unit with regard to the vehicle or regarding the arrangement of the local position of the mobile unit to a sector of the vehicular environment, a transmitter radiating an electromagnetic field can be used as well as the field strength of the electromagnetic field of the detecting receiver (localization sensor system). The local position of the mobile unit with regard to the vehicle will then be determined based on the field strength of the electromagnetic field detected by the receiver. Thereby, the respective local position or the respective sector, where the mobile unit will have been located, can be easily and precisely determined. In particular, several transmitters respectively radiating one electromagnetic field can be arranged in fixed local positions on the exterior of the vehicle. The transmitters can then be distributed evenly, or not, on the exterior of the vehicle. The mobile unit will then have at least one of the receivers detecting the field strength of the electromagnetic field. The local position of the mobile unit with regard to the vehicle or the sector, where the mobile unit will be located, will be determined based on the receivers detecting the field strength of the electromagnetic fields. The determination can be made by the mobile unit itself in particular. Certainly, it can also be determined outside of the mobile unit, such as by the vehicle and transmitted to the mobile unit. Thereby, a very precise determination of the local position becomes possible as well.

Preferably, the mobile unit will also be executed to remote control the vehicle. The vehicle can then be especially easily maneuvered for an operator of the mobile unit through the environmental data depicted on the mobile unit. The present embodiments will be especially well suited to ease maneuvering of the vehicle. Through the environmental data depicted on the mobile unit specific to the location, an additional spotter or passenger will not be necessary. In particular, the remote control system will be able to control the speed and/or braking and/or steering of the vehicle. The remote control system can also control simple or complex driving maneuvers of the vehicle through a template. This will then be transmitted from the mobile unit to the vehicle, whereupon the vehicle will perform the driving maneuvers itself. Thereby, parking or hitching processes can be automated, for example.

The present embodiments also relate to a computer program product for performing the procedures explained above, when the computer program product has been installed on a computer.

The present embodiments also relate to a driving assistance system for monitoring a vehicle's environment. The driving assistance system will be executed in particular for performing the procedures explained above. The driving assistance system will be executed to determine the environmental data of a vehicle and to transfer the environmental data to a mobile unit as well as to represent the environmental data on the mobile unit. Furthermore, the driving assistance system will be executed to determine a local position of the mobile unit with regard to the vehicle and to represent the environmental data depending on the local position on the mobile unit.

Furthermore, the present embodiments relate to a mobile unit for monitoring a vehicle's environment. This will be executed to receive the environmental data of a vehicle, in particular from an environmental sensor system of the vehicle, and will be executed to represent the environmental data depending on a local position of the mobile unit with regard to the vehicle.

In particular, the mobile unit will be a mobile unit carried by a person. In particular, the mobile unit will be a mobile telephone, such as a smartphone, for example, or a tablet PC, a laptop, a handheld computer and so on. In particular, the transmitter(s) radiating an electromagnetic field will involve a bluetooth transmitter, a WLAN transmitter, an NFC transmitter, an RFID transmitter and so on, such as a commercially common transmitter in the IT industry. In this context, RFID means radio frequency identification; WLAN, wireless local area network and NFC, near field communication. In particular, this will respectively involve a BLE tag (BLE meaning bluetooth low energy). The receivers respectively detecting the electromagnetic field correspondingly involve those, such as the fields for bluetooth, NFC, WLAN, RFID and so on, that can detect such fields and detect their field strength. The types of transmitters indicated above have proven to be especially suitable for this application.

Preferably, each transmitter will be executed to use radiation to individually identify such transmitters, especially an individual string of characters in the radiation of the electromagnetic field, especially in continuous operation. Thus, each of the electromagnetic fields can be precisely assigned to the transmitter underlying the field. The receiver will then be executed to detect these individual identifications. Thereby, the field strength detected by the electromagnetic field receiver can assign each to the respective transmitter. The determination of the local position of the mobile unit can be significantly refined because the constructive position of the transmitter on the vehicle will be known and the field strength for each field can be determined individually.

BRIEF DESCRIPTION OF THE DRAWING

The following paragraphs will explain the present embodiments based on a figure of an advantageous example, from which additional advantageous characteristics of the present embodiments can be seen. Thereby, the figure will show a top view of a vehicle as well as a mobile unit in the schematic representation.

DETAILED DESCRIPTION

According to the figure, the vehicle has been executed using multiple steps. For example, Tractor Vehicle 1 has been connected to Trailer 2. In principle, only one of the Trailer 2's can be intended or the Trailer 2's would not be necessary. The vehicle has been equipped with an environmental sensor by means of whose environmental data the vehicle will be determined. In the depicted example, the environmental sensor system involves multiple Camera 3's that have been advantageously arranged on the exterior of the vehicle. In particular, the Camera 3's have been arranged so that the entire environment of the vehicle will covered by the Camera 3's. Accordingly, the front of the vehicle, the back and both sides (driver's and passenger's sides) will be recorded by the Camera 3's. Certainly, the environmental sensor system can have additional sensors for the determination of the environmental data of the vehicle. For example, additional potential positions for the cameras have been depicted in the FIGURE. The environmental sensor system can furthermore have one or more sensors for ultrasound, radar, laser, infrared light and so on. One part, or all, of the environmental data determined thereby will be transmitted to Portable Mobile Unit 4. A mobile telephone or tablet PC may be involved, for example. The mobile unit may be operated by Operator 5. Thereby, a driver or passenger in the vehicle can be involved, for example. In the depicted example, Operator 5 will be located outside of the vehicle at the level of the first Trailer 2 with Mobile Unit 4. Mobile Unit 4 has been executed in order to control the vehicle in particular. For that reason, Operator 5 can move the vehicle from the external position, where they are located, in order to drive backwards to a loading dock, for example. The corresponding commands will be transferred from the mobile unit to the vehicle wirelessly in particular.

The situation depicted in the FIGURE results in Operator 5 being at a local position where they cannot see the entire vehicular environment. For example, they cannot Obstacle 6, which is located on the passenger side at the level of the first Trailer 2. Moving the vehicle therefore results in a potential for danger.

In order to minimize this potential for danger, the local position of Mobile Unit 4 with regard to the vehicle will therefore be determined. Depending on the determination of the local position, the environmental data that will be acquired by the environmental sensor system (in this case, Camera 3) will be depicted on Mobile Unit 4. According to the FIGURE, the image acquired by Camera 3 on the passenger side may be depicted on Mobile Unit 4. Thereby, Obstacle 6 will be displayed on Mobile Unit 4 (Obstacle 6'). Accordingly, Operator 5 will also be notified about the area of the vehicular environment that cannot be seen.

Certainly, other environmental data can be displayed to Operator 5 on Mobile Unit 4 depending on the environmental sensor system used, such as a radar image, an ultrasound image, an infrared image and so on. The depiction can also deviate from the image rendering the vehicle's environment. Thus, a distance between the vehicle and Obstacle 6 may optionally or additionally be displayed as well. The intention may also optionally or additionally be that the data (colors, shapes, perspectives and so on) will be differently propagated depending on the local position determined for Mobile Unit 4.

The local position of Mobile Unit 4 with regard to the vehicle can be determined by means of a special localization sensor system, as depicted in the FIGURE. The local position can certainly be determined otherwise, as desired, for example by evaluating the environmental data of the camera images from Camera 3. According to the FIGURE, Transmitter 7 of the localization sensor system has been arranged in fixed local positions on the exterior of the vehicle, which respectively radiates an electromagnetic field, X. In particular, Transmitter 7 has been arranged in the area of the vehicle's edges, in particular in the area of the upper edge. In contrast, Mobile Unit 4 has Receiver 8 as part of the localization sensor system, which will detect the field strength of the X electromagnetic fields in Mobile Unit 4's area. The field strength of the X electromagnetic fields will fall off as the distance from the respective Transmitter 7 increases. Accordingly, the local position where Receiver 8 is located in relation to Mobile Unit 4 will be determined by measuring the respective field strength. For example, this can be determined through trigonometric calculations, empirical attempts or on the basis of detection fields.

Preferably, Transmitter 7 will radiate an individual identification with the respective X electromagnetic field. Accordingly, Transmitter 7 radiating the respective field can be identified based on each X electromagnetic field. In addition to the field strength, Receiver 8 will then detect the associated individual identification. The field strength of the X electromagnetic field exhibited by each Transmitter 7 can be determined at the current local position of Mobile Unit. The position of Transmitter 7S on the vehicle are known, because they have been constructively specified. From the knowledge of the individual field strengths and the constructive positions of Transmitter 7's, the respective local position of Mobile Unit 4 with regard to the vehicle can then be precisely determined through trigonometric calculations, for example.

In order to keep the number of possible variations of representations on Mobile Unit 4 in manageable limits, the intention can be the division of the vehicular environment into several discrete sectors, A to H. In this case, the exact local position of Mobile Unit 4 or Receiver 8 will not be determined, but rather ultimately in those sectors, A to H, where Mobile Unit 4 or Receiver 8's are located. The environmental data depicted on Mobile Unit 4 will correspondingly be adjusted to the respective sectors, A to H, where Mobile Unit 4 will be located. In the depicted example, Mobile Unit 4's will be in Sector F. Thereby, the image of Camera 3 on the passenger side will be represented on Mobile Unit 4. If Mobile Unit 4 were located in Sector D (on the front of the vehicle), for example, Sector H (the back of the vehicle) would not be visible for Operator 5 and would therefore be represented on Mobile Unit 4. If Operator 5 were located with Mobile Unit 4 in the area of Sector A, the image of Camera 3 would be represented on the driver side and on the front side would be depicted on Mobile Unit 4. Correspondingly, this applies for the other sectors, A to H. Certainly, a lesser or greater number can be intended for Sectors A to H.

In the FIGURE, a driver seat has been intended with reference indicator 9. Correspondingly, the driver's side is located on the left side of the vehicle and the passenger side on the right side of the vehicle. The front of the vehicle is located in the area of Sector D and the back of the vehicle is located in the area of Sector H.

It should be noted that Receiver 8 can be replaced by a Transmitter 7 radiating an electromagnetic field. In this case, Transmitter 7 depicted in the FIGURE must be replaced by a corresponding Receiver 8. The local position of Mobile Unit 4 can also be determined thereby. Alternatively or additionally, positions for Sensors 7 and receivers have been depicted in FIGURE by boxes. Certainly, Transmitter 7's and/or Receivers 8 can also be arranged at other vehicle positions. In particular, BLE-tags are involved for the Transmitter 7. Correspondingly, Receiver 8 will serve to detect the field strength of the BLE tags.

In particular, Transmitter 7's will be connected with power supplies on the respective electrical on-board network of the vehicle. Alternatively, they can be powered by batteries or an electrical generator for generating the required operating power (energy harvesting).

REFERENCE INDICATORS

1 Tractor vehicle
1' Depiction of Tractor Vehicle 1 on Mobile Unit 4
2 Trailer
2' Depiction of Trailer 2 on Mobile Unit 4
3 Environmental sensor system, cameras
4 Mobile unit
5 Operator
6 Obstacle 6' Depiction of Obstacle 6 on Mobile Unit 4
7 Transmitters
8 Receivers
9 Reference indicator
A-H Sectors
X Electromagnetic field

The invention claimed is:

1. A method for monitoring a vehicle environment and controlling a movement of the vehicle, the method comprising:
   determining environmental data of a vehicle with an environmental sensor system;
   transmitting the environmental data to a mobile unit;
   determining a local position of the mobile unit with respect to the vehicle;
   selecting a subset of the environmental data based on the local position of the mobile unit when the mobile unit is outside the vehicle and depicting the subset of the environmental data on the mobile unit, the subset of the environmental data including an image of a non-visible area from the perspective of the mobile unit based on the location of the mobile unit relative to the vehicle, the non-visible area being an area that is on an opposite side of the vehicle relative to the mobile unit; and
   transmitting a signal to the vehicle from the mobile unit, wherein the signal controls the movement of the vehicle,
   wherein the mobile unit is configured to control the vehicle remotely from an external location with respect to the vehicle, and
   wherein a different subset of the environmental data is selected such that the non-visible area displayed on the mobile unit is updated when the vehicle is stopped and when the mobile unit moves relative to the vehicle.

2. The method of claim 1, wherein the vehicle environment is divided into several discrete sectors such that determining the local position of the mobile unit includes determining which sector the mobile unit is located, and
   wherein the subset of the environmental data that is depicted on the mobile unit is selected based on the determined sector where the mobile unit is located.

3. The method of claim 1, wherein subset of the environmental data depicted by the mobile unit includes environmental data from local positions not visible from the determined local position.

4. The method of claim 3, wherein the environmental sensor system includes at least one camera configured to record images of the vehicle environment, and
   wherein the subset of the environmental data depicted on the mobile unit includes images of an area of the vehicle environment not visible from the determined local position.

5. The method of claim 1, further comprising:
   radiating an electromagnetic field from at least one transmitter; and
   detecting a strength of the electromagnetic field from at least one receiver,
   wherein the local position of the mobile unit is determined by the detected strength of the electromagnetic field.

6. The method of claim 5, wherein a plurality of transmitters each radiate an electromagnetic field, and where the plurality of transmitters are distributed in fixed positions on an exterior of the vehicle,
   wherein the mobile unit has a receiver of the at least one receiver for detecting the field strength of the electromagnetic fields transmitted by each of the transmitters, and
   wherein the local position of the mobile unit with respect to the vehicle is determined based on the strength of each of the electromagnetic fields detected by the receiver of the mobile unit.

7. A driving assistance system for monitoring a vehicle environment, the driving assistance system comprising:
   a mobile unit configured to control a movement of the vehicle remotely from an external location with respect to the vehicle; and
   an environmental sensor system for determining environmental data of the vehicle and transfer the environmental data to the mobile unit,
   wherein the mobile unit is configured to depict a subset of the environmental data when the mobile unit is outside the vehicle, the subset of the environmental data including an image of a non-visible area from the perspective of the mobile unit based on the location of the mobile unit relative to the vehicle, the non-visible area being an area that is on an opposite side of the vehicle relative to the mobile unit,
   wherein the subset of the environmental data is based on a local position of the mobile unit with respect to the vehicle, and
   wherein a different subset of the environmental data is selected such that the non-visible area displayed on the mobile unit is updated when the vehicle is stopped and when the mobile unit moves relative to the vehicle.

8. The driving assistance system of claim 7, wherein the vehicle environment is divided into several discrete sectors such that the local position of the mobile unit is based on the sector where the mobile unit is located.

9. The driving assistance system of claim 7, wherein subset of the environmental data depicted by the mobile unit includes environmental data from local positions not visible from the local position of the mobile unit.

10. The driving assistance system of claim 9, wherein the environmental sensor system includes at least one camera configured to record images of the vehicle environment, and
    wherein the subset of the environmental data depicted on the mobile unit includes images of an area of the vehicle environment not visible from the local position.

11. The driving assistance system of claim 7, further comprising:
    a plurality of transmitters, where each of the transmitters is configured to radiate an electromagnetic field, and wherein the transmitters are fixed with respect to the vehicle, and
    a receiver configured to detect respective strengths of the electromagnetic fields from the transmitters, wherein the mobile unit includes the receiver.

12. The driving assistance system of claim 11, wherein the local position of the mobile unit is determined based on the strengths of the electromagnetic fields.

13. The driving assistance system of claim 7, wherein the vehicle comprises a tractor vehicle and at least one trailer.

14. The driving assistance system of claim 13, wherein at least one sensor of the environmental sensor system is fixed to a trailer of the vehicle.

15. A mobile unit for monitoring a vehicle environment, the mobile unit comprising a display,
    wherein the mobile unit is configured to receive environmental data from an environmental sensor system,
    wherein the mobile unit is configured to depict a subset of the environmental data on the display, where the subset of the environmental data is determined based on a local position of the mobile unit with respect to a vehicle when the mobile unit is at an external location with respect to the vehicle, and wherein a different subset of the environmental data is depicted on the display when the vehicle is stopped and when the mobile unit moves relative to the vehicle, and wherein the mobile unit is configured to control the vehicle remotely from the external location with respect to the vehicle.

16. The mobile unit of claim 15, further comprising:

a receiver configured to determine a strength of an electromagnetic field radiated by at least one transmitter, wherein the local position of the mobile unit is determined based on the detected strength of the electromagnetic field.

\* \* \* \* \*